(12) United States Patent
Amorosi et al.

(10) Patent No.: US 7,249,735 B2
(45) Date of Patent: Jul. 31, 2007

(54) TRANSLATING CONDUIT APPARATUS FOR AN AIRPLANE OR EQUIPMENT

(75) Inventors: Stephen R. Amorosi, Seattle, WA (US); Jeffrey P. Baucum, Sammamish, WA (US); Dennis Chin, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 106 days.

(21) Appl. No.: 11/170,811

(22) Filed: Jun. 30, 2005

(65) Prior Publication Data

US 2007/0034747 A1    Feb. 15, 2007

(51) Int. Cl.
*B64C 13/28* (2006.01)
*B64C 9/22* (2006.01)

(52) U.S. Cl. .................. 244/99.2; 244/214
(58) Field of Classification Search ........ 244/214–216, 244/99.2; 439/165
See application file for complete search history.

(56) References Cited

U.S. PATENT DOCUMENTS

| | | | | |
|---|---|---|---|---|
| 1,540,104 | A * | 6/1925 | Cook, Jr. ................... | 244/214 |
| 3,370,382 | A * | 2/1968 | Rumsey ................... | 49/340 |
| 4,159,089 | A * | 6/1979 | Cole ........................ | 244/214 |
| 4,437,631 | A * | 3/1984 | Martens et al. ............ | 244/214 |
| 4,640,477 | A | 2/1987 | Pace | |
| 4,752,049 | A | 6/1988 | Cole | |
| 4,763,862 | A * | 8/1988 | Steinhauer et al. ......... | 244/215 |
| 4,915,327 | A * | 4/1990 | Ellmers et al. ............ | 244/210 |
| 5,114,100 | A | 5/1992 | Rudolph | |
| 5,141,446 | A * | 8/1992 | Ozouf et al. ............... | 439/165 |
| 5,865,400 | A | 2/1999 | Pike | |
| 5,873,544 | A | 2/1999 | Pike | |
| 6,070,742 | A | 6/2000 | McAnally | |
| 6,805,248 | B2 | 10/2004 | Champion | |
| 7,011,276 | B2 * | 3/2006 | Stephan ..................... | 244/216 |
| 2006/0038088 | A1 * | 2/2006 | Dodson ..................... | 244/214 |

* cited by examiner

*Primary Examiner*—Rob Swiatek
(74) *Attorney, Agent, or Firm*—Timothy T. Klintworth; Wildman Harrold Allen & Dixon (57) ABSTRACT

An apparatus for an airplane or other equipment is provided. The apparatus may comprise a multitude of connected arms which are adapted to rotate relative to one another. One end of the apparatus may be connected to a fixed wing, while another end of the apparatus may be connected to a moving slat. The apparatus may be used to deliver conduit from the fixed wing to the moving slat. The conduit may comprise one or more of an electrical de-icing wire, a sensor wire, a control wire, a fiber optic line, and a pneumatic line. Within an internal pathway of the apparatus, the conduit may be freely looped around a curved surface at least one-half turn and fixedly secured to a linear surface. Methods of use and assembly are also provided.

29 Claims, 8 Drawing Sheets

TRANSLATING CONDUIT APPARATUS FOR AN AIRPLANE OR EQUIPMENT

BACKGROUND

Most prior commercial airplanes have utilized hot-air systems to de-ice the leading edge of wings by delivering, often through a series of ducts within the wings, hot-bleed-air from the engines to the wings. These systems often divert some of the thrust potential of the engines. On newer commercial airplanes, such as the 787, the wing ice protection system may be electrically driven, which is more efficient than using bleed air.

Aircraft wings typically utilize leading edge slats to aid in lift capability. The slats have a retracted position when the airplane is in flight, and a downwardly and forwardly extended position during takeoff and landing. However, one of the problems introduced with electrically driven anti-ice systems is how to deliver the electrical power wires, control wires, and sensor wires from the fixed wing to the moving leading edge slats. In their extended position, the slats may translate a significant distance away from the fixed wing at a significant angle. For instance, in one embodiment, the slats may translate approximately 20 inches and rotate approximately 30 degrees when traveling from their retracted positions to their extended positions. Moreover, the power required to anti-ice one leading edge slat may be significant. For instance, in one embodiment, the power required to provide ice protection to one leading slat may be thousands of watts. Additionally, differing planes may utilize a varying number of slats which may require ice protection. For instance, the 787 may require between 3 to 5 slats de-iced per wing.

A translating apparatus is needed which will have the capability of delivering de-icing electrical wires, including control and sensor wires, from the fixed wing to the moving leading edge slats in both their retracted and extended positions. The environment through which the translating apparatus may have to deliver the wires may be severe in temperature, aerodynamics with potentially near mach flow, vibration, and erosion due to rain or ice.

SUMMARY

In one aspect, an apparatus for the wing of an airplane comprises a first arm member defining a first internal pathway, a second arm member defining a second internal pathway, and a pivot connector connecting the first and second arm members.

In another aspect, an apparatus for an airplane comprises a first arm member defining a first internal pathway in which an end of the first arm member is adapted to be pivotally connected to another arm member. A conduit is positioned through the first internal pathway. The conduit is configured into at least one-half of a loop at the end of the first arm member.

In yet another aspect, a method of extending the apparatus for the wing of an airplane is disclosed. A first arm member is provided which defines a first internal pathway. A second arm is provided which defines a second internal pathway. A pivot connector is provided to connect the first and second arm members. At least one of the first and second arm members is retracted into a first position, and then extended into a second position.

In still another aspect, a method of assembling an apparatus for an airplane wing is disclosed. A first arm member is provided which has a first internal pathway. A second arm member is provided which has a second internal pathway. A conduit is also provided. The first arm member is pivotally connected to the second arm member, and the conduit is extended from the first internal pathway into the second internal pathway.

The present invention, together with further objects and advantages, will be best understood by reference to the following detailed description taken in conjunction with the accompanying drawings.

DETAILED DESCRIPTION OF THE PREFERRED EMBODIMENTS

The following description of preferred embodiments provides examples of the present invention. The embodiments discussed herein are merely exemplary in nature, and are not intended to limit the scope of the invention in any manner. Rather, the description of these preferred embodiments serves to enable a person of ordinary skill in the art to make and use the present invention.

Figure 1:
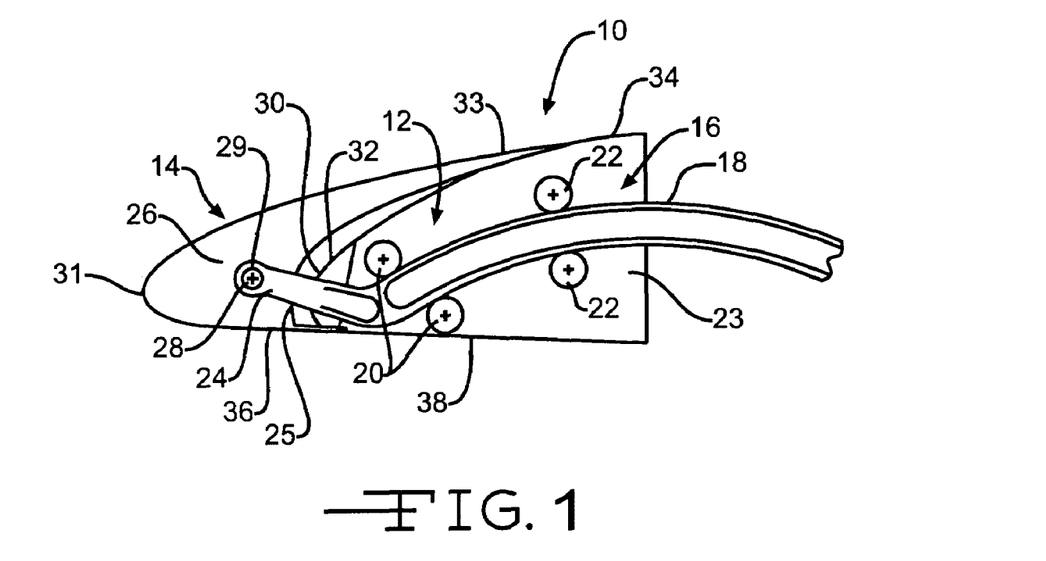
FIG. 1 is a sectional view of a forward portion of an airfoil in its flight configuration, taken along a vertical plane coinciding with a chord-wise axis of the airfoil.
Figure 2:
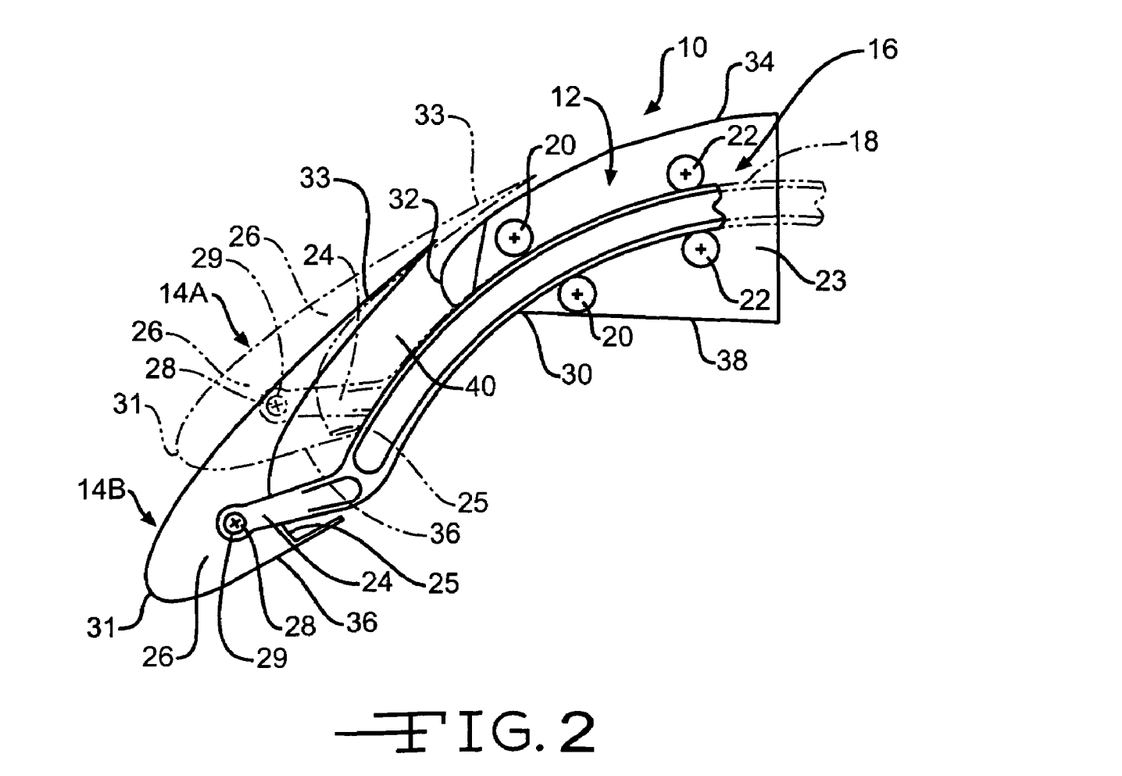
FIG. 2 is a view similar to FIG. 1, but showing the leading edge slat of the airfoil in two deployed positions during takeoff and landing.

A better understanding of the present invention will be obtained by first describing the overall configuration of one embodiment of the forward portion of a wing 10, in both its cruise position shown in FIG. 1 and in its take-off and landing positions shown in FIG. 2, for which the present invention is particularly adapted. After this description, the translating wire apparatus of the present invention will be described as shown in FIGS. 3–9. It should be noted that while FIGS. 1 and 2 depict one embodiment of a wing 10 for which the invention is adapted, that the present invention is applicable to any wing configuration known in the art. Moreover, the present invention may be applicable to other non-wing parts of an airplane, in addition to being applicable to equipment in non-aeronautical applications.

FIG. 1 is a simplified drawing of a leading edge portion of a wing 10 of an aircraft. The wing 10 comprises a fixed leading edge structure 12, which is part of the main wing structure, and a translating leading edge slat 14, which is mounted to the fixed leading edge structure 12 by means of a track assembly 16. It should be noted that a wing 10 may contain a varying number of slats 14, depending on the type of plane, which may need ice-protection. Typically, there are between two to eight slats 14 per wing 10. The track assembly 16 comprises a main track 18 mounted in forward and rear sets of rollers 20 and 22, respectively, which are in turn mounted within an interior cavity 23 of the fixed leading edge structure 12. The forward end 24 of the track 18 extends through an aperture 30 in the forward skin portion 32 of the fixed leading edge structure 12, and also extends through an aperture 25 in the leading edge slat 14 into an interior cavity 26 of the leading edge slat 14. A bolt 28 extends through a hole 29 in the forward end 24 of the track 18 through a corresponding hole (not shown) in the leading edge slat 14 in order to fixedly connect the forward end 24 of the track 18 to the leading edge slat 14. Because of the configuration and path of travel of the track 18, the apertures 25 and 30 have dimensions which are moderately larger than the dimensions of the track 18 in order to provide adequate clearance to allow the track 18 to extend through the apertures 25 and 30 in each of the positions shown in FIGS. 1 and 2.

In FIG. 1, the slat 14 is depicted in its retracted position directly adjacent the fixed leading edge structure 12. The slat 14 is in the retracted position of FIG. 1 when the plane is in flight with the wing 10 in its cruise configuration. In the position of FIG. 1, the leading edge 31 of the slat 14 forms the leading edge of the entire wing 10, and the upper rear portion 33 of the slat 14 extends rearwardly in a moderately upward slant to blend aerodynamically with the upper surface 34 of the wing 10. Similarly, the lower rear portion 36 of the slat 14 blends aerodynamically with the lower surface 38 of the wing 10.

FIG. 2 shows the slat 14 in two different positions 14A and 14B to maximize lift capability during takeoff and landing. In its takeoff position, the slat 14 is in the position designated by the broken lines indicated by 14A. In its landing position, the slat is in the position designated by the lines indicated by 14B. In both of the positions 14A and 14B, the slat 14 forms with the surface of the forward skin portion 32 of the leading edge structure 12 a slot 40 through which air flows from beneath the slat 14 upwardly and then over the upper surface 34 of the wing 10. To deploy the slat 14 to the appropriate locations for optimum aerodynamic performance, the track 18 is formed in a moderate curve. As the track 18 moves from the position of FIG. 1 to the positions of FIG. 2, the track 18 has both forward and downward components of motion.

Figure 3:
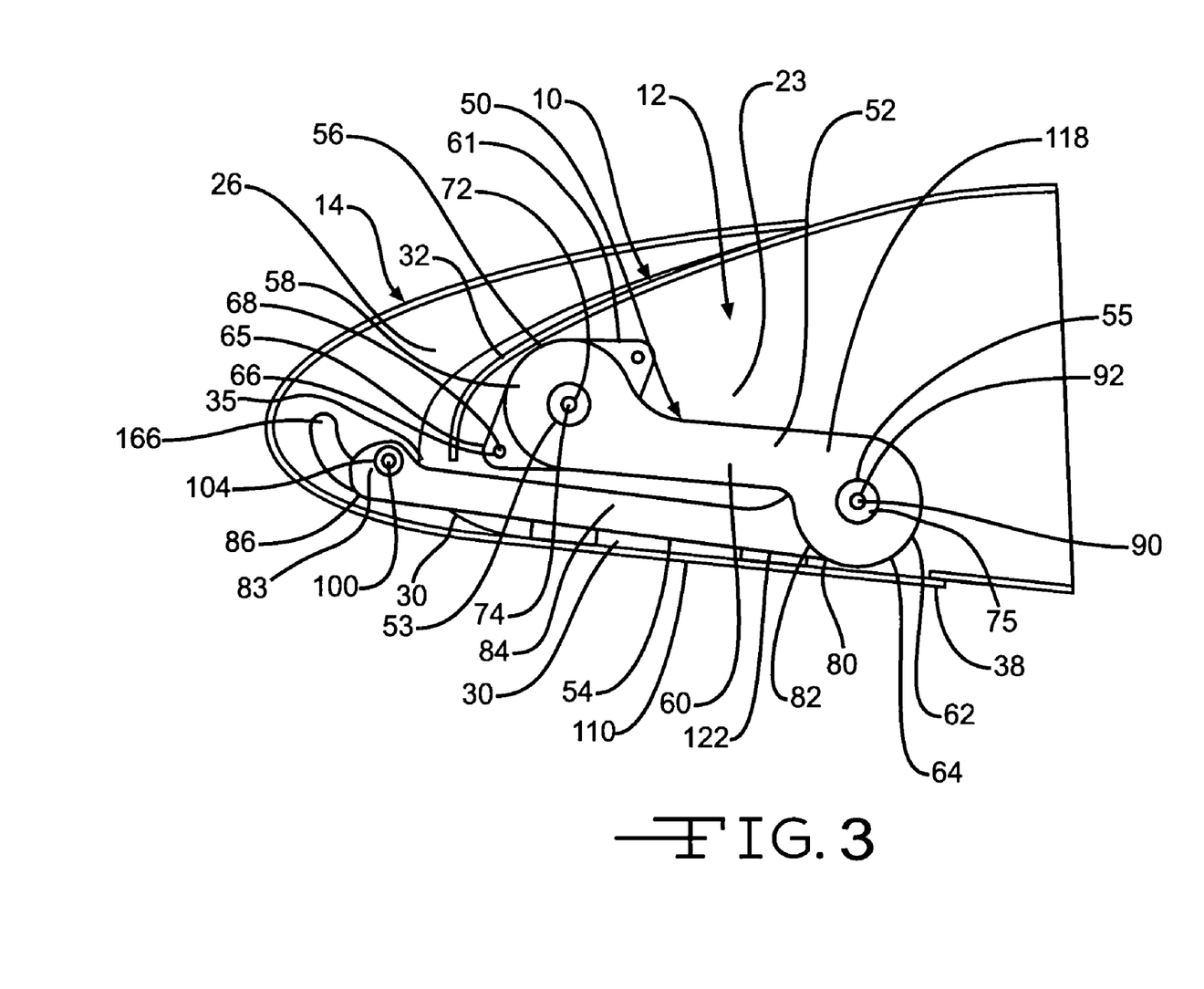
FIG. 3 is a sectional view of the configuration of FIG. 1 showing the translating apparatus of the present invention in its retracted configuration, according to an embodiment of the invention.
Figure 4:
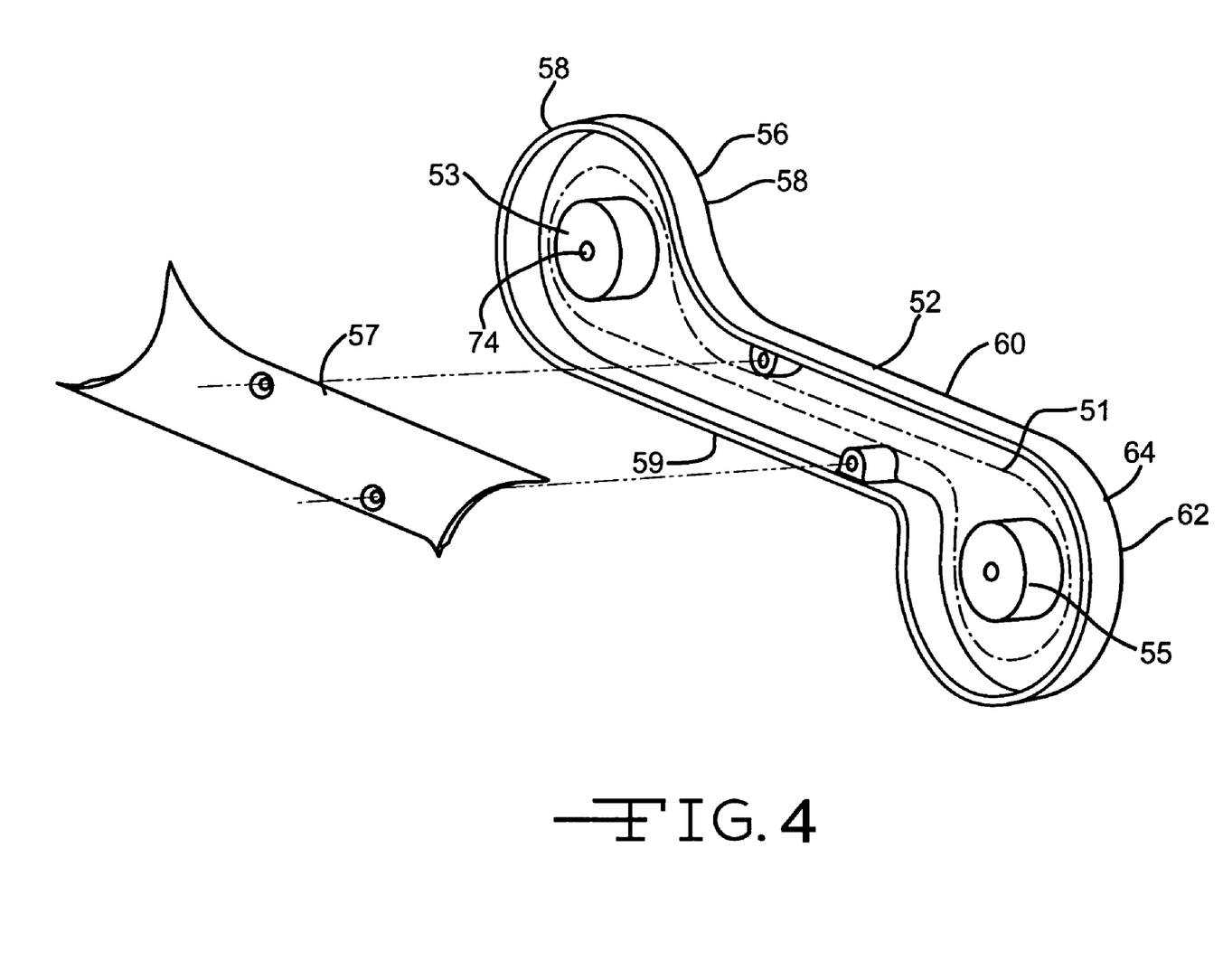
FIG. 4 is a sectional view of the first arm of the translating apparatus of FIG. 3 with the first arm's cover removed.
Figure 5:
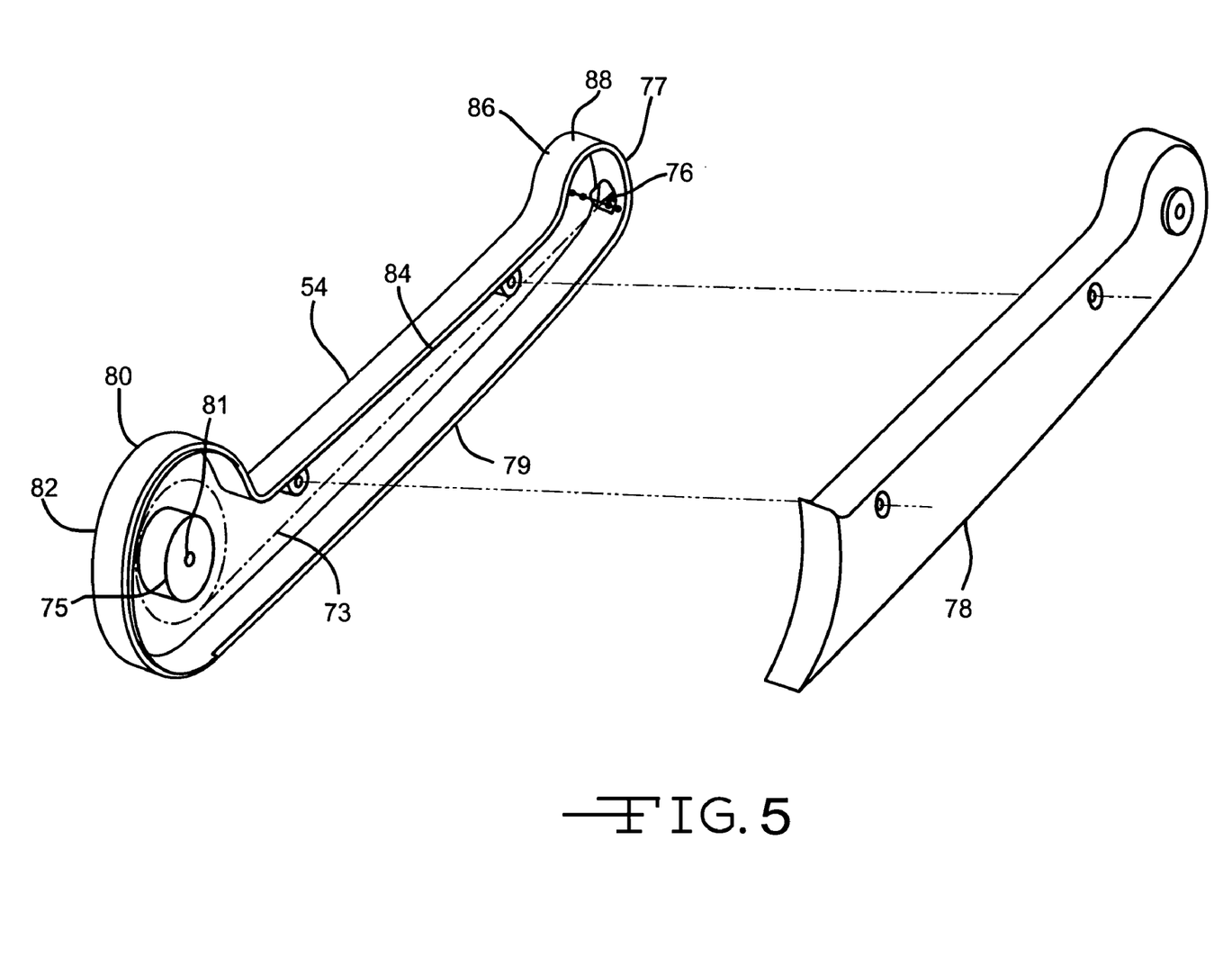
FIG. 5 is a sectional view of the second arm of the translating apparatus of FIG. 3 with the second arm's cover removed.

FIG. 3 depicts a sectional view of the leading edge portion of the wing 10 of FIG. 1 in its retracted position incorporating an embodiment of the translating apparatus 50 of the present invention. For ease of illustration, the track assembly 16, connecting the slat 14 to the fixed leading edge structure 12, is not shown. The translating apparatus 50 comprises a multiple link system having a first arm 52 and a second arm 54. FIGS. 4 and 5 show sectional views of the first and second arms 52 and 54 respectively. The first and second arms 52 and 54 may be made of aluminum, plastic, a composite material, and may be manufactured using any material or process known in the art.

Figure 6:
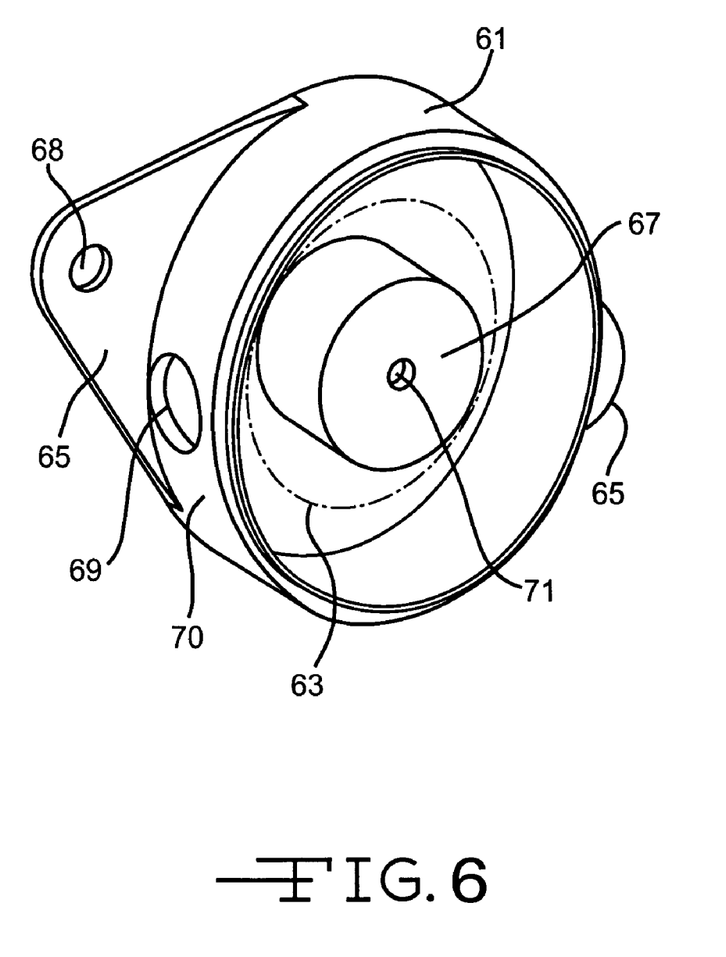
FIG. 6 is a perspective view of the support fitting of FIG. 3 which rotate-ably attaches the first arm to the fixed wing.

As shown in FIG. 4, the first arm 52 comprises a joint surface 56 substantially in the shape of a half-torus at one end 58 of the first arm 52, a substantially linear mid-section 60, and another joint surface 62 substantially in the shape of a half-torus at another end 64 of the first arm 52. In other embodiments, the joint surfaces 56 and 62 may be rounded, curved, or in any other type of configuration. Within the first arm 52, an internal pathway 51 extends around a first hub 53, through a cavity in the substantially linear mid-section 60, and around a second 55 hub. The first arm 52 is approximately 11 inches but may be varying lengths in other embodiments. A removable cover 57 is bolted (not shown) to a side 59 of the first arm 52 to gain access to the internal pathway 51. As shown in FIGS. 3 and 6, inside the fixed leading edge structure's cavity 23, a support fitting 61 is fixedly attached to the fixed leading edge structure 12 through the use of lugs 66 extending through openings 68 in flanges 65. FIG. 6 shows another view of the support fitting 61. The support fitting 61 contains an internal pathway 63 extending around a hub 67. A hole 69 extends through an outer surface 70 of the support fitting 61 to allow conduit (not shown) to extend into the internal pathway 63.

As shown in FIGS. 3 and 6, bolt 72 extends through a hole 74 in the hub 53 of the joint surface 56 through hole 71 in the hub 67 of the support fitting 61 to attach the end 58 of the first arm 52 to the fixed leading edge structure 12. As shown in FIGS. 3, 4, and 6, due to the alignment of the hubs 53 and 67, conduit (not shown) may be extended through the hole 69 and looped over the internal pathways 51 and 63 about both hubs 53 and 67. The joint surface 56 is adapted to rotate around the bolt 72 to allow movement of the first arm 52 relative to the support fitting 61 and fixed leading edge structure 12. In another embodiment, fixed leading edge 12 may comprise a pair of ribs with joint surface 56 being supported on both sides in double shear. In still other embodiments, any mechanism known in the art, such as ball-bearings and ball-joints, may be utilized to allow the joint surface 56 to rotate relative to the fixed leading edge structure 12.

As shown in FIG. 5, the second arm 54 comprises a joint surface 80 substantially in the shape of a half-torus at one end 82 of the second arm 54, a substantially linear mid-section 84, and another joint surface 86 substantially in the shape of a lug and clevis at the other end 88 of the second arm 54. In other embodiments, the joint surfaces 80 and 86 may be in any type of configuration. The second arm 54 is approximately 14 inches but may be varying lengths in other embodiments. An internal pathway 73 extends around a hub 75 within the second arm 54, and through cavities in the substantially linear mid-section 84 and joint surface 86. A hole 76 extends through an outer surface 77 of the joint surface 86 to allow conduit (not shown) to exit the internal pathway 73. A removable cover 78 is bolted (not shown) to a side 79 of the second arm 54 to gain access to the internal pathway 73. As shown in FIGS. 3, 4, and 5, a bolt 90 extends through a hole 92 in the hub 55 of the joint surface 62 of the first arm 52 through another hole 81 in the hub 75 of the joint surface 80 of the second arm 54. In such manner, the first arm 52 is connected to the second arm 54 with both arms adapted to rotate relative to each other around the bolt 90. In other embodiments, any mechanisms known in the art, such as dual-co-axial bolts, bearings, and ball-joints, may be utilized to connect the first arm 52 to the second arm 54 to allow relative movement of the arms with respect to one another.

Due to the alignment of the hubs 55 and 75, conduit (not shown) may be extended from the internal pathway 51 of the first arm 52, looped around both hubs 55 and 75, and extended into the internal pathway 73 of the second arm 54. Inside the slat's cavity 26, a ball-joint 100 connects an outer surface 83 of the second arm 54 to the slat 14 to allow relative movement of the second arm 54 with respect to the slat 14. In other embodiments, other mechanisms known in the art, such as bearings, ball-joints, and bolt-joints, may be utilized to connect the second arm 54 to the slat 14 to allow relative movement of the second arm 54 with respect to the slat 14. It should be noted that in other embodiments, the joint surfaces 56, 62, 80, and 86 of the first and second arms 52 and 54 may be in any configuration known in the art.

In its cruise position of FIG. 3, the translating apparatus 50 is in a retracted position. In this position, the entire first arm 52 is retracted within the interior cavity 23 of the fixed leading edge structure 12. Additionally, in this position, most of the second arm 54, including the joint surface 80, a portion of the substantially linear mid-section 84, and a portion of the joint surface 86, is also retracted within the interior cavity 23 of the fixed leading edge structure 12. While in this position, the substantially linear mid-section 84 of the second arm 54 is substantially parallel to the lower surface 38 of the fixed leading edge structure 12. The remaining portion of the joint surface 86 extends from the interior cavity 23 of the fixed leading edge structure 12, through the aperture 30 in the forward skin portion 32 of the fixed leading edge structure 12, through the aperture 35 in the leading edge slat 14 and into the interior cavity 26 of the leading edge slat 14. In other embodiments, the first and second arms 52 and 54 of the translating apparatus 50 may be positioned in a variety of configurations with respect to the fixed leading edge structure 12.

A bottom surface 110 of the second arm 54 acts as a door to substantially seal the aperture 30 of the fixed leading edge structure 12 in order to substantially avoid wind drag created by wind traveling into the aperture 30. The door 110 may be spring loaded to the second arm 54. In other embodiments, the translating apparatus 50, and its associated door 110, may translate out of and substantially seal a separate aperture other than the aperture 30 out of which the track 18 in the forward skin portion 32 of the fixed leading edge structure 12 extends. In still other embodiments, special seals, such as bulb seals, may be used to seal the aperture 30, or to seal any such separate aperture out of which the translating apparatus 50 may extend, in order to avoid wind-drag.

Figure 7:
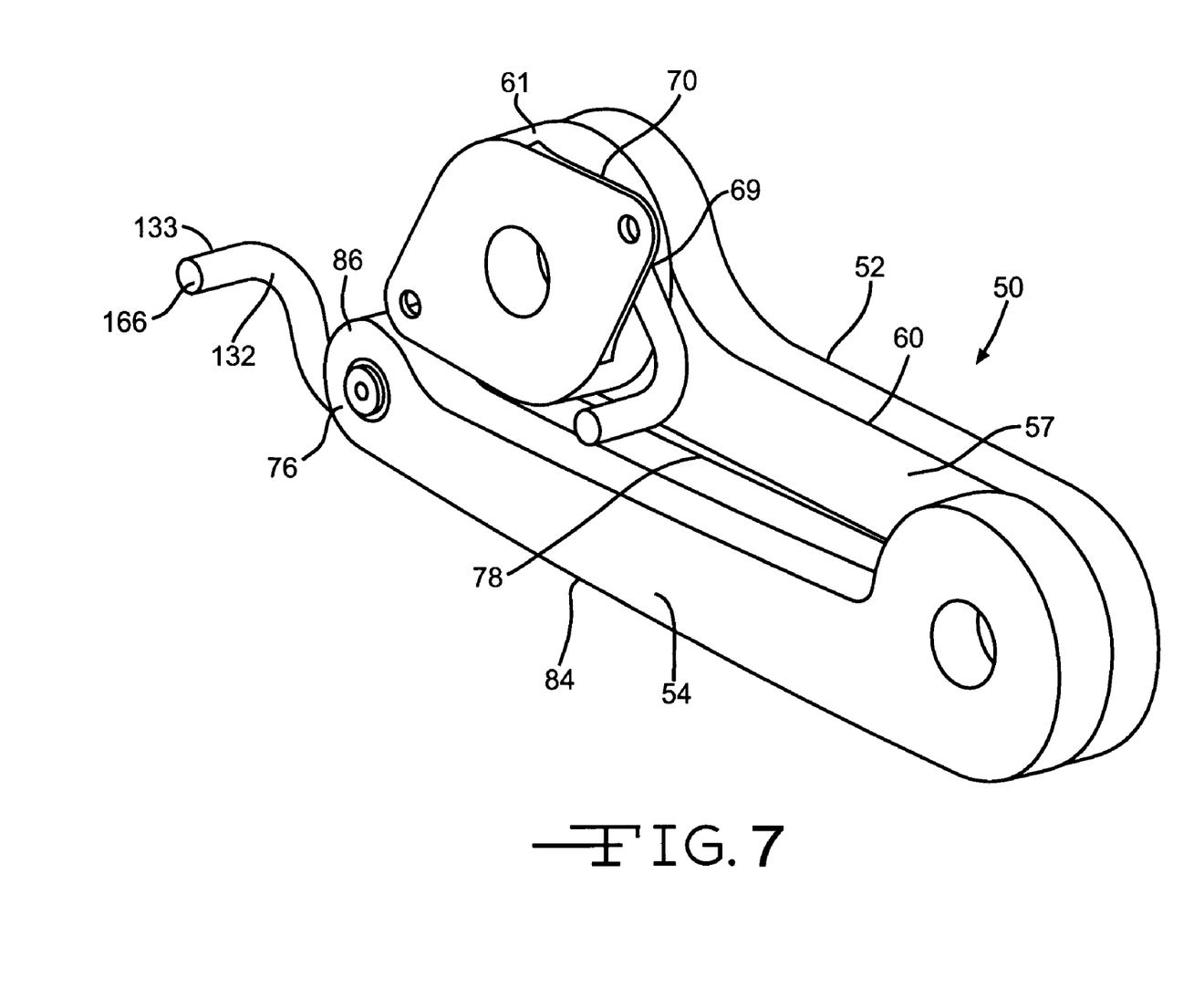
FIG. 7 is a perspective view of the translating apparatus of FIG. 3.
Figure 8:
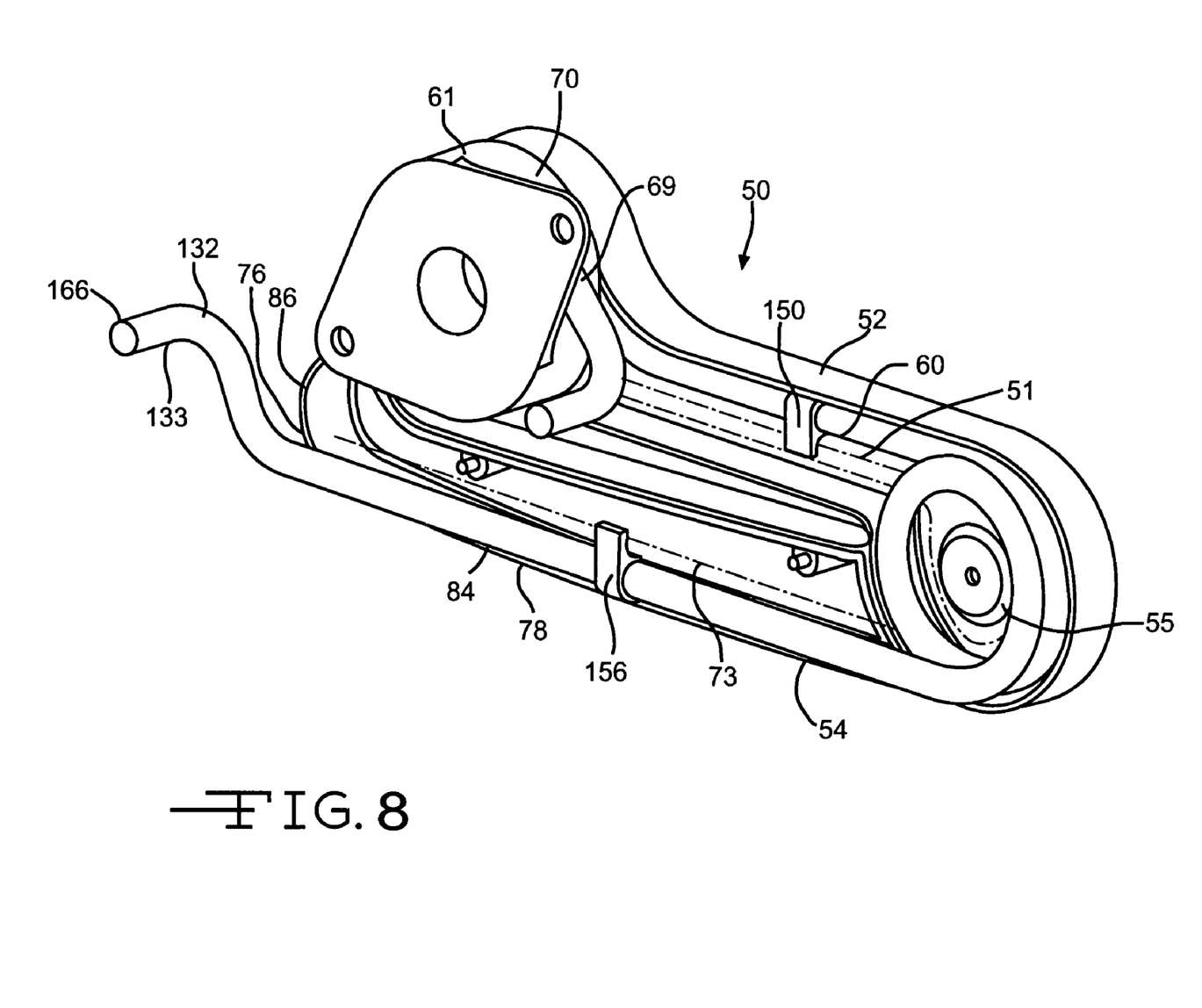
FIG. 8 is a sectional view of the translating apparatus of FIG. 7 allowing the translating apparatus' inner conduit pathway to be seen.

FIG. 7 shows a view of the translating apparatus 50 in its retracted cruise position with the covers 57 and 78 bolted to the first and second arms 52 and 54 and conduit 132 extending into the translating apparatus 50. In other embodiments, the covers 57 and 78 may be connected using screws, snap-fits, or other fastening mechanisms known in the art. FIG. 8 shows a sectional view of the translating apparatus 50 of FIG. 7 depicting the path of the conduit 132 within the internal pathways 51 and 73 of the first and second arms 52 and 54. In an embodiment, the conduit 132 comprises an assortment of electrical wires to provide ice protection to the slat 14, sensor wires to take temperature measurements of the slat 14, and control wires to regulate temperate conditions of the slat 14, all enclosed within a heat-shrunk sheath-covering 133. In other embodiments, the conduit 132 may comprise various types of conductors, fiber optic lines, pneumatic lines, and other types of wiring known in the art. The conduit 132 may be protected by any type of covering apparatus known in the art. The conduit 132 may comprise a circular wire bundle, a flat-ribbon cable, or other types of wiring known in the art and may include any number of different types of wires in differing shapes and sizes. The conduit 132 is approximately three-quarters of an inch in diameter, but may be varying sizes in other embodiments.

As shown in FIGS. 6 and 8, the conduit 132 extends from the power source, through hole 69 in the outer surface 70 of the support fitting 61 into the support fitting's internal pathway 63. As seen in FIGS. 4, 6, and 8, the conduit 132 freely coils around the hubs 67 and 53 of the support fitting 61 and first arm 52 at least one-half turn and extends into the internal pathway 51 within the first arm 52. In other embodiments, the conduit 132 may freely coil around an internal curved surface in any shape or configuration.

As depicted in FIGS. 4, 5, and 8, the conduit 132 follows the internal pathway 51 through the cavity in the substantially linear mid-section 60, freely coils at least one-half turn around the hubs 55 and 75 of the first and second arms 52 and 54, and extends into the internal pathway 73 of the second arm 54. Wire clamps 150 fixedly anchor the conduit 132 to the mid-section 60 of the first arm 52 to avoid sliding and abrasion of the conduit 132 within the mid-section 60. The conduit 132 extends through the cavities in the substantially linear mid-section 84 and joint surface 86 and exits the second arm 54 through the hole 76. In other embodiments, the conduit 132 may loosely coil around an additional hub of the second arm 54. In still other embodiments, the conduit 132 may freely coil around an internal curved surface, in any shape or configuration, in either of the first and second arms 52 and 54. Wire clamps 156 fixedly anchor the conduit 132 to the substantially linear mid-section 84 of the second arm 54 to avoid sliding and abrasion of the conduit 132 within the mid-section 84. The end 166 of the conduit 132 hooks up to an electrical mat (not shown) running within an interior surface (not shown) of the slat 14 in order to provide ice protection to the slat 14.

Figure 9:
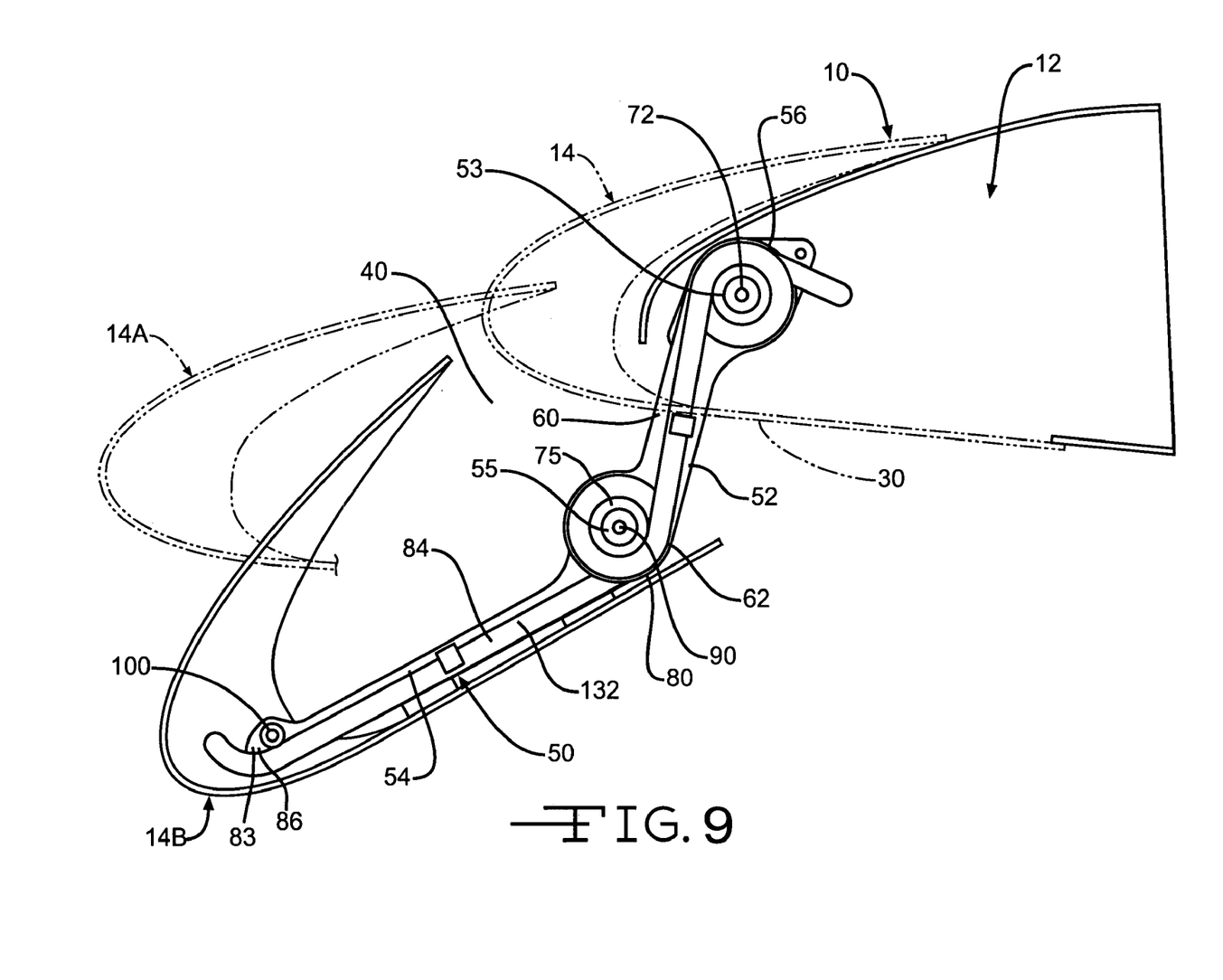
FIG. 9 is a sectional view of the translating apparatus of FIG. 3 in the positions of FIG. 2.

FIG. 9 depicts a sectional view of the leading edge portion of the wing 10 of FIG. 3 with the leading edge portion of the wing 10 in two different positions to maximize lift capability during takeoff and landing. In its takeoff position, the slat 14 is in the position designated by the broken lines indicated by 14A. In its landing position, the slat is in the position designed by the broken lines indicated by 14B. The translating apparatus 50 is shown with portions of its outer housing removed to allow the inner conduit 132 to be seen. The first and second arms 52 and 54 of the translating apparatus 50 move with the slat 14 as it moves from its retracted position to positions 14A and 14B. This is due to the joint surface 56 of the translating apparatus 50 being adapted to rotate around the bolt 72 to allow movement of the first arm 52 relative to the fixed leading edge structure 12; the first arm 52 being adapted to rotate relative to the second arm 54 around the bolt 90; and the outer surface 83 of the second arm 54 being adapted to rotate around the ball-joint 100 to allow movement of the second arm 54 relative to the slat 14.

The translating apparatus 50 is shown in the extended position it travels to when the slat 14 takes the landing position of 14B. As the slat 14 moves from its retracted position to its landing position of 14B, the second arm 54 of the translating apparatus 50 moves with the slat 14 due to the ball-joint connection 100. As the slat 14 moves downwardly and outwardly to obtain the position of 14B, joint surfaces 56, 62, 80, and 86 rotate relative to the fixed leading edge structure 12 and slat 14, allowing the first and second arms 52 and 54 of the translating apparatus 50 to extend through the aperture 30 downwardly and outwardly. From its retracted cruise position to its extended position of 14B, the slat 14 translates approximately 20 inches and rotates approximately 30 degrees. During this movement, the joint surface 56 rotates approximately 90 degrees, joint surfaces 62 and 80 rotate approximately 120 degrees, and joint surface 86 rotates approximately 15 degrees. In other embodiments, the slat 14 and translating apparatus 50 may translate in differing amounts.

While this movement is taking place, the conduit 132 remains fixedly attached to the mid-sections 60 and 84 but freely coils and uncoils around the hubs 53, 55, and 75. In other embodiments, the conduit 132 may loosely coil around another hub of the second arm 54. In further embodiments, the conduit 132 may freely coil around an internal curved surface, in any shape or configuration, in either of the first and second arms 52 and 54. Although the position of the translating apparatus 50 is not shown when the slat 14 is in the position of 14A, the same principles apply as the translating apparatus 50 extends downwardly and outwardly with movement of the slat 14.

In an embodiment, the translating apparatus 50 of the present invention provides a relatively compact design allowing it to integrate within the small space in the wing 10 without penetrating the main wing box or causing other systems, most notably the High Lift Torque Tube, to be re-routed. It additionally provides a design that does not produce severe bending, or change in bend radius, of the conduit 132. This allows a more fatigue resistant design. Further, the first and second arms 52 and 54 completely enclose the conduit 132 to substantially shield it from air-flow and erosion and prevent dirt and other debris from contacting the conduit 132. In addition, this embodiment provides a low-cutout allowing for less disturbance on the slot 40 between the fixed leading edge 12 and the slat 14. This embodiment can also be made relatively narrow, allowing for even less disturbance on the slot 40 between the fixed leading edge 12 and the slat 14. Finally, this embodiment is such that rubbing and abrasion of the conduit 132 is limited.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that the appended claims, including all equivalents thereof, are intended to define the scope of the invention.

The invention claimed is:

1. An apparatus for the wing of an airplane comprising:
a first arm member defining a first internal pathway;
a second arm member defining a second internal pathway; and
a pivot connector connecting the first and second arm members, wherein at least one of said first and second arm members comprise at least one joint surface substantially in the shape of a half-torus.

2. The apparatus of claim 1, wherein at least one of said first and second arm members are made of one or more of aluminum, plastic, and a composite material.

3. The apparatus of claim 1, wherein at least one of said first and second arm members comprise at least one joint surface which is substantially curved.

4. The apparatus of claim 1, wherein at least one of said first and second arm members comprise a substantially linear section.

5. The apparatus of claim 1, wherein said first arm member is adapted to be rotatably attached to the wing of an airplane using a support fitting.

6. The apparatus of claim 5, wherein a first end of said first arm member is adapted to be rotatably attached to the wing of an airplane using one or more of a bolt, bearing, and ball-joint.

7. The apparatus of claim 1, wherein said pivot connector is one of a bolt, bearing, and ball-joint.

8. The apparatus of claim 1, wherein said first and second internal pathways intersect at an end of said first member and an end of said second member.

9. The apparatus of claim 8, further comprising an internal curved surface at said intersection.

10. The apparatus of claim 9, further comprising a conduit which extends through the first internal pathway, extends around said internal curved surface at least one-half turn, and extends into said second internal pathway.

11. The apparatus of claim 10, wherein said conduit is fixedly attached to linear sections of said first and second arm members and said conduit is adapted to freely coil and uncoil around said internal curved surface.

12. The apparatus of claim 9, wherein said internal curved surface is in the shape of a hub.

13. The apparatus of claim 1, further comprising a conduit which extends through the first internal pathway and into said second internal pathway.

14. The apparatus of claim 13, wherein said conduit comprises at least one of an electrical de-icing wire, a sensor wire, a control wire, a fiber optic line, and a pneumatic line.

15. The apparatus of claim 1, wherein a portion of said second arm member comprises a door which is adapted to seal an aperture in the wing of an airplane.

16. The apparatus of claim 15, wherein said door is spring-loaded.

17. The apparatus of claim 15, wherein said door is adapted to seal an aperture in the wing of an airplane utilizing bulb seals.

18. The apparatus of claim 1, wherein said second arm member is adapted to be pivotally connected to a slat.

19. An airplane having an apparatus comprising:
a first arm member defining a first internal pathway in which an end of the first arm member is adapted to be pivotally connected to another arm member, wherein said first arm member comprises at least one joint surface substantially in the shape of a half-torus; and
a conduit positioned through the first internal pathway, said conduit configured into at least one-half loop at said at least one joint surface.

20. The apparatus of claim 19, wherein a second end of said first arm member is adapted to be rotatably connected to a fixed wing of an airplane.

21. The apparatus of claim 19, wherein an end of said first arm member comprises at least one internal curved surface and said conduit is configured into at least one-half loop around said at least one internal curved surface.

22. The apparatus of claim 21, wherein said conduit is fixedly attached to a linear portion of said first internal pathway and said conduit is adapted to freely coil and uncoil around said at least one internal curved surface.

23. The apparatus of claim 19, wherein said conduit is fixedly attached to a linear portion of said first internal pathway and said conduit is adapted to freely coil and uncoil at an end of the first arm member.

24. A method of extending apparatus for the wing of an airplane comprising:
providing a first arm member defining a first internal pathway;
providing a second arm member defining a second internal pathway;
providing a pivot connector connecting said first and second arm members, wherein at least one of said first and second arm members comprise at least one joint surface substantially in the shape of a half-torus;

retracting at least one of said first and second arm members into a first position; and extending at least one of said first and second arm members into a second position.

25. The method of claim 24, further comprising providing a conduit and extending said conduit through said first internal pathway into said second internal pathway.

26. The method of claim 24, further comprising providing a conduit, extending said conduit through said first internal pathway, extending said conduit around an internal curved surface at least one-half turn, and extending said conduit into said second internal pathway.

27. A method of assembling an apparatus for an airplane wing comprising:

providing a first arm member having a first internal pathway;

providing a second arm member having a second internal pathway, wherein at least one of said first and second arm members comprise at least one joint surface substantially in the shape of a half-torus;

providing a conduit;

pivotally connecting said first arm member to said second arm member; and extending said conduit from said first internal pathway into said second internal pathway.

28. The method of claim 27, wherein at least one end of said first and second arm members comprises a substantially curved surface.

29. The method of claim 28, wherein said conduit is extended from said first internal pathway, said conduit is coiled around said substantially curved surface at least one-half turn, and said conduit is extended into said second internal pathway.

* * * * *